United States Patent
Tamura et al.

(10) Patent No.: US 10,423,572 B2
(45) Date of Patent: Sep. 24, 2019

(54) PERFORMING LIVE UPDATES TO FILE SYSTEM VOLUMES

(71) Applicant: Apple Inc., Cupertino, CA (US)

(72) Inventors: Eric B. Tamura, Sunnyvale, CA (US);
Eric S. Brown, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 470 days.

(21) Appl. No.: 15/275,099

(22) Filed: Sep. 23, 2016

(65) Prior Publication Data
US 2018/0089206 A1    Mar. 29, 2018

(51) Int. Cl.
*G06F 16/11*    (2019.01)
*G06F 16/16*    (2019.01)
*G06F 8/656*    (2018.01)

(52) U.S. Cl.
CPC ............ *G06F 16/128* (2019.01); *G06F 8/656* (2018.02); *G06F 16/162* (2019.01)

(58) Field of Classification Search
CPC ....... G06F 16/128; G06F 16/162; G06F 8/656
See application file for complete search history.

(56) References Cited

U.S. PATENT DOCUMENTS

| | | | |
|---|---|---|---|
| 7,457,982 | B2 | 11/2008 | Rajan |
| 8,082,407 | B1 | 12/2011 | Chatterjee et al. |
| 8,732,417 | B1 | 5/2014 | Stringham |
| 8,799,595 | B1 | 8/2014 | Chatterjee et al. |
| 2010/0199272 | A1* | 8/2010 | Mahajan ............ G06F 11/2023 717/171 |
| 2013/0132942 | A1 | 5/2013 | Wang |
| 2013/0254765 | A1 | 9/2013 | Shinohara et al. |
| 2014/0380292 | A1* | 12/2014 | Ru ............................ G06F 8/65 717/168 |
| 2015/0242283 | A1* | 8/2015 | Simoncelli .......... G06F 11/1456 711/162 |
| 2016/0092203 | A1* | 3/2016 | Filali-Adib .......... G06F 9/4856 717/171 |
| 2016/0162278 | A1 | 6/2016 | Kondik et al. |
| 2016/0342520 | A1* | 11/2016 | Patil ...................... G06F 16/10 |
| 2017/0242686 | A1* | 8/2017 | Vidyadhara ............. G06F 8/656 |
| 2018/0052680 | A1* | 2/2018 | Anglin .................... G06F 8/656 |
| 2018/0260237 | A1* | 9/2018 | Noll ..................... G06F 9/45558 |

OTHER PUBLICATIONS

European Patent Application No. 17188720.1—Extended European Search Report dated Feb. 12, 2018.
(Continued)

*Primary Examiner* — Richard L Bowen
(74) *Attorney, Agent, or Firm* — Dickinson Wright RLLP

(57) ABSTRACT

The described embodiments set forth techniques for performing live updates to file system volumes (e.g., operating system (OS) file system volumes) of computing devices through the utilization of snapshots. In particular, the techniques enable a computing device to remain active while a majority of an update process is performed, which eliminates the considerable functional downtime that is normally imposed when implementing conventional update techniques. Moreover, the overall robustness of the update process is enhanced as the techniques described herein reduce the amount of time that is required for the computing device to remain in the above-described specialized update mode.

20 Claims, 11 Drawing Sheets

(56) References Cited

OTHER PUBLICATIONS

"How to use snapshots NetBSD", The NetBSD Project, Jun. 27, 2013, XP055444769, 2 pages, https://wiki.netbsd.org/tutorials/howtousesnapshots/.
"Mounting File Systems (System 2,11 Administration Guide, vol. 3)", Mar. 4, 2015, XP055445058, 4 pages, https://docs.oracle.com/cd/E19455-01/806-0916/6ja8539fm/index.html.

* cited by examiner

PERFORMING LIVE UPDATES TO FILE SYSTEM VOLUMES

FIELD

The described embodiments set forth techniques for performing live updates to file system volumes of computing devices through the utilization of snapshots.

BACKGROUND

Existing approaches for performing operating system (OS) updates are task-intensive and highly prone to error. For example, a common approach for updating an OS of a mobile device involves the following steps: (1) receiving an OS update package at the mobile device, (2) unpacking the OS update package, (3) rebooting the mobile device into a specialized update mode and performing the update (in accordance with the OS update package) to produce an updated OS, and (4) rebooting the device/loading the updated OS. Unfortunately, step (3) is associated with a number of considerable drawbacks that have yet to be addressed. For example, when step (3) is carried out, the mobile device enters into an inoperable state for a considerable period of time where a user of the mobile device cannot utilize the important functionalities (e.g., connectivity) normally provided by the mobile device. Moreover, when step (3) is carried out, the specialized update mode places the mobile device in a vulnerable state that can potentially render the mobile device inoperable, e.g., when a power failure occurs, when the update fails, and the like. Accordingly, there exists a need for a more efficient and stable technique for updating operating systems on computing devices.

SUMMARY

The described embodiments set forth techniques for performing live updates to file system volumes (e.g., operating system (OS) file system volumes) of computing devices through the utilization of snapshots. In particular, the techniques enable a computing device to remain active while a majority of an update process is performed, which eliminates the considerable functional downtime that is normally imposed when implementing conventional update techniques. Moreover, the overall robustness of the update process is enhanced as the techniques described herein reduce the amount of time that is required for the computing device to remain in the above-described specialized update mode.

One embodiment sets forth a technique for performing a live update of a file system volume on a computing device. According to some embodiments, the technique can include the steps of (1) establishing a first mount of the file system volume in a read-only mode, where the first mount is based on a first snapshot of the file system volume, (2) obtaining an update package for the file system volume, (3) establishing a second mount of the file system volume in a read-write mode, (4) applying the update package to the file system volume within the second mount to generate an updated file system volume, (5) generating a second snapshot of the file system volume based on the updated file system volume, and (6) establishing a third mount of the updated file system volume in a read-only mode, wherein the third mount is based on the second snapshot. According to some embodiments, the third mount of the updated file system volume in the read-only mode can occur after the computing device is rebooted. In this manner, a clean boot can occur where the first and second mounts are eliminated and the third mount—which includes the update file system volume—is intact. In this manner, a live update of the file system volume on the computing device can be performed while substantially reducing the amount of time that the computing device operates in the specialized update mode, thereby improving overall efficiency and robustness.

Other embodiments include at least one non-transitory computer readable medium configured to store instructions that, when executed by at least one processor included in a computing device, cause the computing device to implement any of the techniques set forth herein. Further embodiments include a computing device that includes at least one memory and at least one processor that, in conjunction, enable the computing device to implement the various techniques set forth herein.

This Summary is provided merely for purposes of summarizing some example embodiments to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments

BRIEF DESCRIPTION OF THE DRAWINGS

The included drawings are for illustrative purposes and serve only to provide examples of possible structures and arrangements for the disclosed inventive apparatuses and methods for their application to computing devices. These drawings in no way limit any changes in form and detail that can be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments described herein set forth techniques for performing live updates to file system volumes of computing devices through the utilization of snapshots. According to some embodiments, a file system manager executing on a computing device can be configured to implement the various techniques described herein. In particular, the file system manager can be configured to mount different file system volumes—e.g., an operating system (OS) file system volume, a user file system volume, and the like—on the computing device. According to some embodiments, the file system manager can be configured to mount these file system volumes in different manners in order to implement the different techniques described herein, e.g., the file system volumes can be mounted in a read-only mode, a read/write mode, a hidden read/write mode, and the like.

According to some embodiments, the file system manager can be configured to service requests for generating snapshots of the file system volumes. According to some embodiments, a storage included in/accessible to the computing device can be configured to store different snapshots of different file system volumes of the computing device, where each snapshot includes data that represents a particular file system volume at a particular point in time. For example, a first snapshot can include a complete copy of the data of a file system volume at a first point in time, and a related/second snapshot can include only the data that represents the changes made to the file system volume between when the first snapshot was established and the second snapshot was established.

As described in greater detail herein, the file system manager can be configured to utilize snapshots of file system volumes—as well as different file system mount modes (e.g., read only mode, read/write mode, hidden read/write mode, etc.)—to perform live updates to the file system volumes in a secure, stable, and unobtrusive manner. A more detailed discussion of these techniques is set forth below and described in conjunction with FIGS. 1-4, which illustrate detailed diagrams of systems and methods that can be used to implement these techniques.

Figure 1:
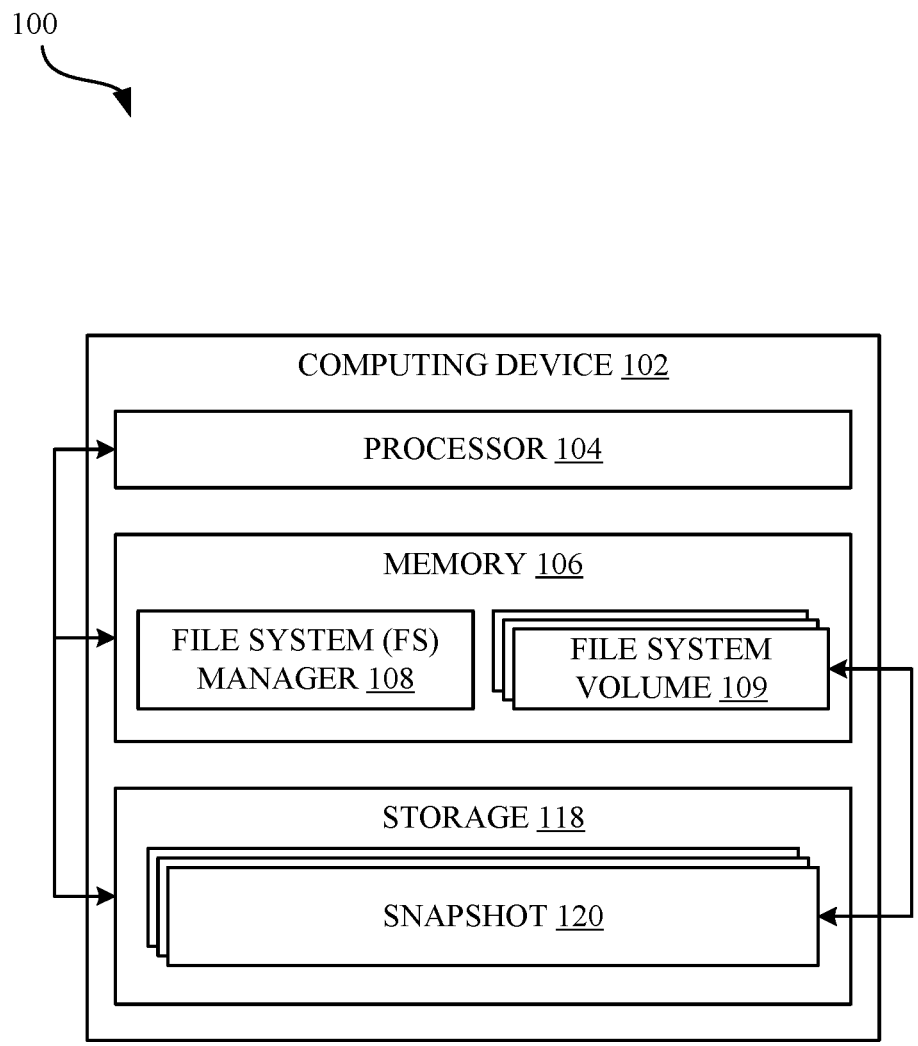
FIG. 1 illustrates a block diagram of different components of a computing device configured to implement the various techniques described herein, according to some embodiments.

FIG. 1 illustrates a block diagram 100 of different components of a computing device 102 that is configured to implement the various techniques described herein, according to some embodiments. More specifically, FIG. 1 illustrates a high-level overview of the computing device 102, which, as shown, can include at least one processor 104, at least one memory 106, and at least one storage 118. According to some embodiments, the processor 104 can be configured to work in conjunction with the memory 106 and the storage 118 to enable the computing device 102 to operate in accordance with this disclosure. For example, the processor 104 can be configured to load/execute a file system manager 108 that is specifically configured to implement the various techniques described herein. According to some embodiments, and as described in greater detail herein, the file system manager 108 can be configured to mount different file system volumes 109 on the computing device 102, e.g., an operating system (OS) file system volume 109, a user file system volume 109, and the like.

According to some embodiments, an OS file system volume 109 can represent a core OS that is configured to operate on the computing device 102. For example, the OS file system volume 109 can enable a variety of processes to execute on the computing device 102, e.g., OS daemons, native OS applications, user applications, and the like. According to some embodiments, a user file system volume 109 can represent a file system hierarchy that stores user applications and user data that are accessible at the computing device 102 by way of the OS file system volume 109. As previously noted herein, the file system manager 108 can be configured to mount these volumes in different modes in order to implement the different techniques described herein, e.g., the file system volumes 109 can be mounted in a read-only mode, a read/write mode, a hidden read/write mode, and the like. According to some embodiments, the file system volumes 109 can be members of a same (or different) logical container and can be configured to utilize the same physical storage space within the storage 118. This beneficially provides enhanced flexibility as each file system volume 109 can consume space within the storage 118 on an as-needed basis. In addition, each file system volume 109 can be configured to enforce particular configurations (e.g., permissions, ownership, encryption schemes, etc.) that are independent from the configurations of other file system volumes 109 managed by the file system manager 108.

According to some embodiments, the storage 118 can represent a storage that is accessible to the computing device 102, e.g., a hard disk drive, a solid state drive, a mass storage device, a remote storage device, and the like. In some examples, the storage 118 can represent a storage that is accessible to the computing device 102 via a local area network (LAN), a personal area network (PAN), and the like. Although not illustrated in FIG. 1, it is noted that the storage 118 can be configured to store the data of different file system volumes 109 that the file system manager 108 is capable of mounting. For example, the storage 118 can include file system data structures for each file system volume 109, where the file system data structures are utilized by the file system manager 108 to manage the actual data of the file system volumes 109.

According to some embodiments, the storage 118 can be configured to store different snapshots 120 of different file system volumes 109 of the computing device 102, where each snapshot includes data that represents a particular file system volume 109 (and, in some cases, one or more other file system volumes 109) at a particular point in time. For example, a first snapshot 120 can include a complete copy of the data of a file system volume 109, and a related/second snapshot 120 can include only the data that represents changes that have been made to the file system volume 109 between the first snapshot 120 was established and when the second snapshot 120 was established.

According to some embodiments, the file system manager 108 can be configured to service requests for generating snapshots 120 of the file system volumes 109. In particular, the file system manager 108 can be configured to gather data of a file system volume 109, generate a snapshot 120 based on the data, and then provide the snapshot 120 to the storage 118 (or other storage device accessible to the computing device 102). For example, when a request for a first (i.e., an initial) snapshot 120 of a file system volume 109 is received, the file system manager 108 can respond by creating a first snapshot 120 of the file system volume 109. Because this is an initial snapshot 120, no existing/prior snapshots 120 are associated with the file system volume 109, and it is not necessary for the file system manager 108 to rely on analyzing a previous snapshot 120 (i.e., to identify changes) when gathering data to generate the first snapshot 120. Instead, the file system manager 108 gathers the data—e.g., all of the data, or a subset of the data, depending on a configuration—and generates the first snapshot 120 for the file system volume 109. According to some embodiments, the file system manager 108 can also establish associated data structures (e.g., extent delta trees) that enable the file system manager 108 to efficiently identify any changes made to the file system volume 109 subsequent to creating the first snapshot 120 (e.g., when an update package is processed), which can help increase efficiency when generating subsequent snapshots 120.

At a later time, the file system manager 108 can receive a subsequent request to generate a second snapshot 120 of the file system volume 109. In response, and in accordance with the above-described techniques, the file system manager 108 can (1) identify the first snapshot 120 associated with the file system volume 109, (2) identify the data structures associated with the first snapshot 120, and (3) generate a second snapshot 120 that captures the changes represented in the data structures associated with the first snapshot 120.

Accordingly, FIG. 1 sets forth an overview of different components/entities that can be included in the computing device 102 to enable the embodiments described herein to be properly implemented. As described in greater detail below, the file system manager 108 can utilize the file system volumes 109/snapshots 120 to implement techniques for performing live updates to file system volumes 109 (e.g., an OS file system volume 109), thereby enhancing overall stability and performance.

Figure 2A:
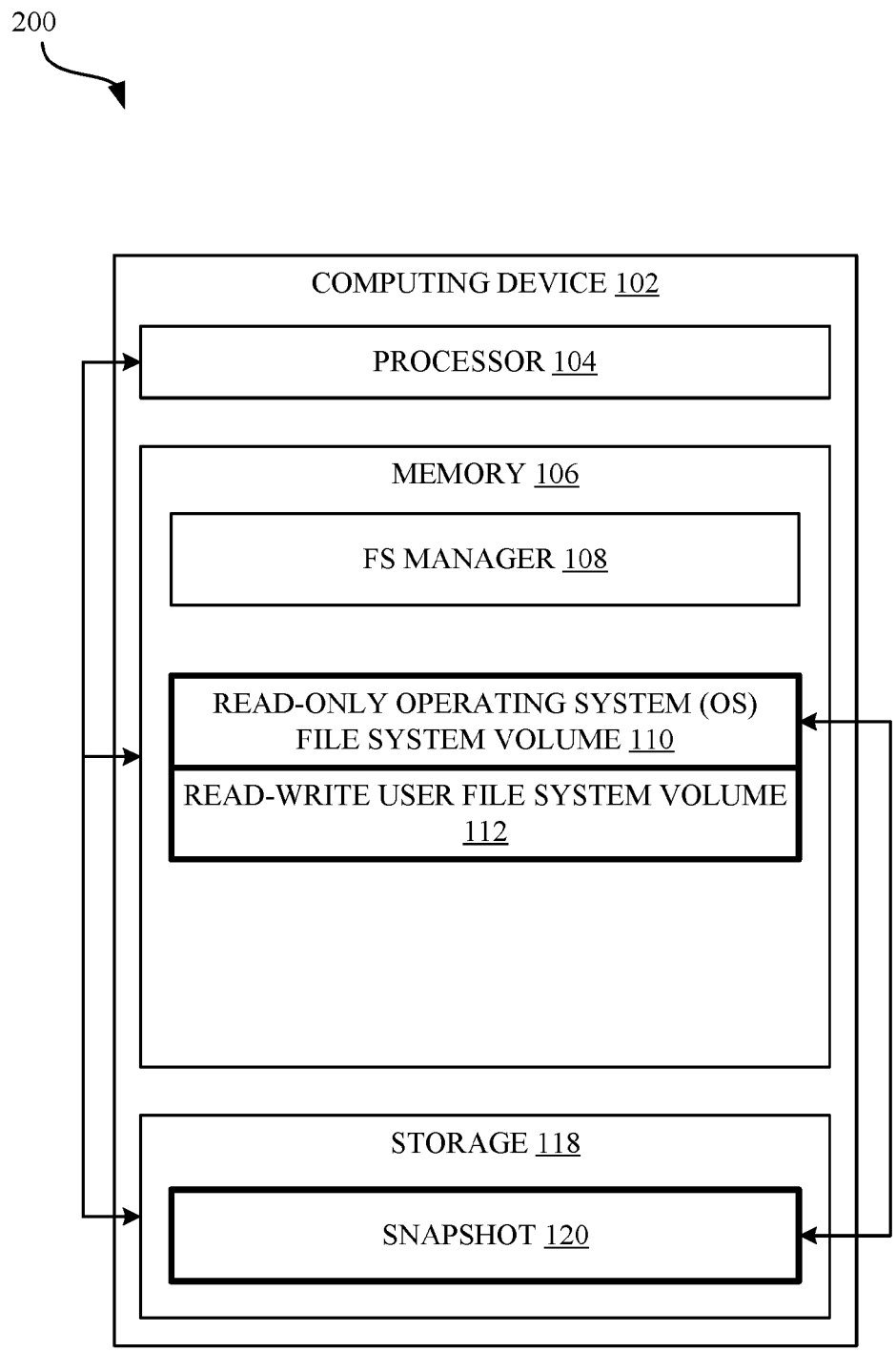
FIGS. 2A-2H illustrate block diagrams of the computing device of FIG. 1 carrying out a live update of a file system volume 109, according to some embodiments.

FIGS. 2A-2H illustrate block diagrams of the computing device of FIG. 1 carrying out a live update of a file system volume 109, according to some embodiments. As shown in FIG. 2, at a first step 200, the file system manager 108 mounts two different file system volumes 109 on the computing device 102: an OS file system volume 110 in a read-only mode, and a user file system volume 112 in a read/write mode. According to some embodiments, mounting a file system volume can involve making the file system volume accessible for reading (when in a read-only mode) and writing (when in a read/write mode). For example, mounting a file system volume can involve identifying a storage device (e.g., the storage 118) accessible to the computing device 102, identifying at least one available mount point within the storage device, and updating a configuration of the computing device 102 to enable applications executing on the computing device 102 (e.g., a Basic Input/Output System (BIOS) of the computing device 102, an OS of the computing device 102, etc.) to access the contents of the file system volume. As shown in FIG. 2A, the read-only OS file system volume 110 can be mounted based on a first snapshot 120 available in the storage 118 (or other storage accessible to the computing device 102). According to some embodiments, the first snapshot 120 can be created prior to, in conjunction with, or subsequent to mounting the read-only OS file system volume 110. In this manner, the read-only OS file system volume 110 can be mounted based on the first snapshot 120 each time the computing device 102 powers-on.

Figure 2B:
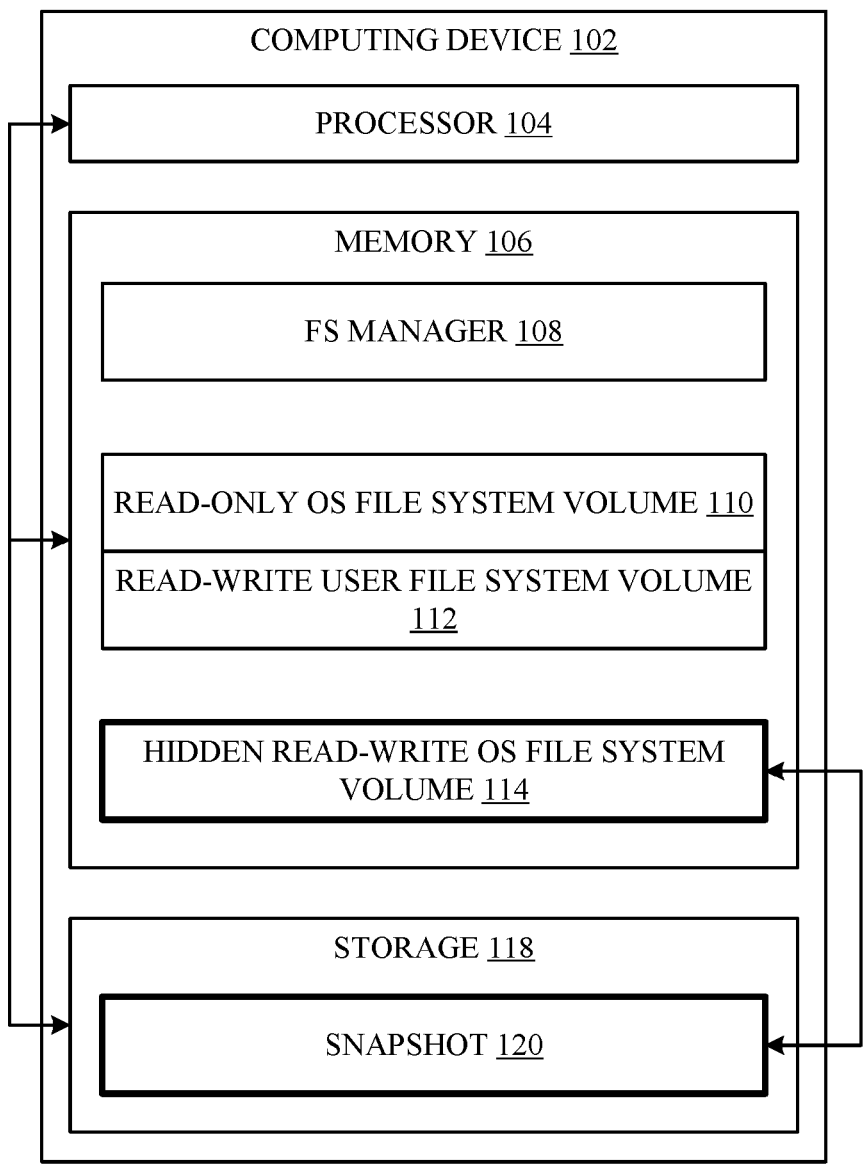

Turning now to FIG. 2B, at step 210, the file system manager 108 mounts an OS file system volume 114 in a hidden read/write mode. According to some embodiments, mounting the OS file system volume 114 in a hidden read/write mode can involve establishing a file system volume mount that is accessible/visible only to particular entities operating at the computing device 102, e.g., daemons of an OS executing on the computing device 102. As shown in FIG. 2B, the hidden read/write OS file system volume 114 can be mounted based on the same first snapshot 120 on which the read-only OS file system volume 110 is based, such that the read-only OS file system volume 110 and the hidden read-write OS file system volume 114 reflect the same state of the OS. According to some embodiments, the hidden read/write OS file system volume 114 is hidden from view of other file system volumes 109 mounted at the computing device. In this manner, the OS files associated with the hidden read/write OS file system volume 114 cannot be improperly modified, e.g., by processes executing in association with the read-only OS file system volume 110 and/or the read-write user file system volume 112. However, as the hidden read/write OS file system volume 114 is readable/writable, OS files can be updated in accordance with an update package even while the read-only OS file system volume 110 and the read/write user file system volume 112 remain operable, which is described below in greater detail in conjunction with FIG. 2C.

Figure 2C:
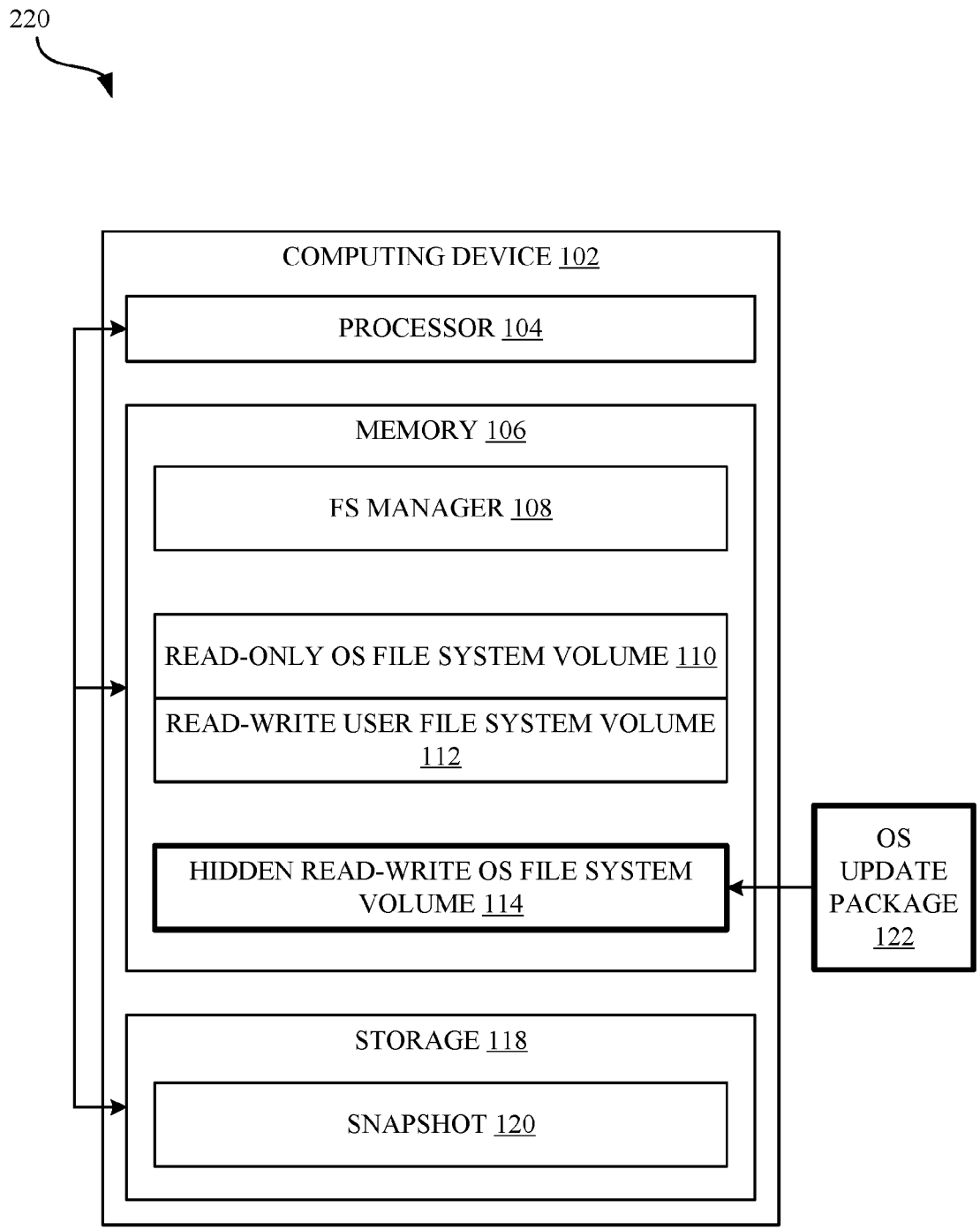

Turning now to FIG. 2C, at step 220, the file system manager 108 receives and applies an OS update package 122 against the hidden read/write OS file system volume 114. According to some embodiments, the OS update package 122 can be downloaded (e.g., over an Internet connection), loaded directly onto the computing device 102 (e.g., over a local wireless/wired connection), and the like, where the OS update package 122 includes instructions/data for updating the OS files associated with the hidden read/write OS file system volume 114. Additionally, the file system manager 108 can be configured to unpack/verify the contents of the OS update package 122 prior to applying the OS update package 122 to ensure authenticity/stability.

Figure 2D:
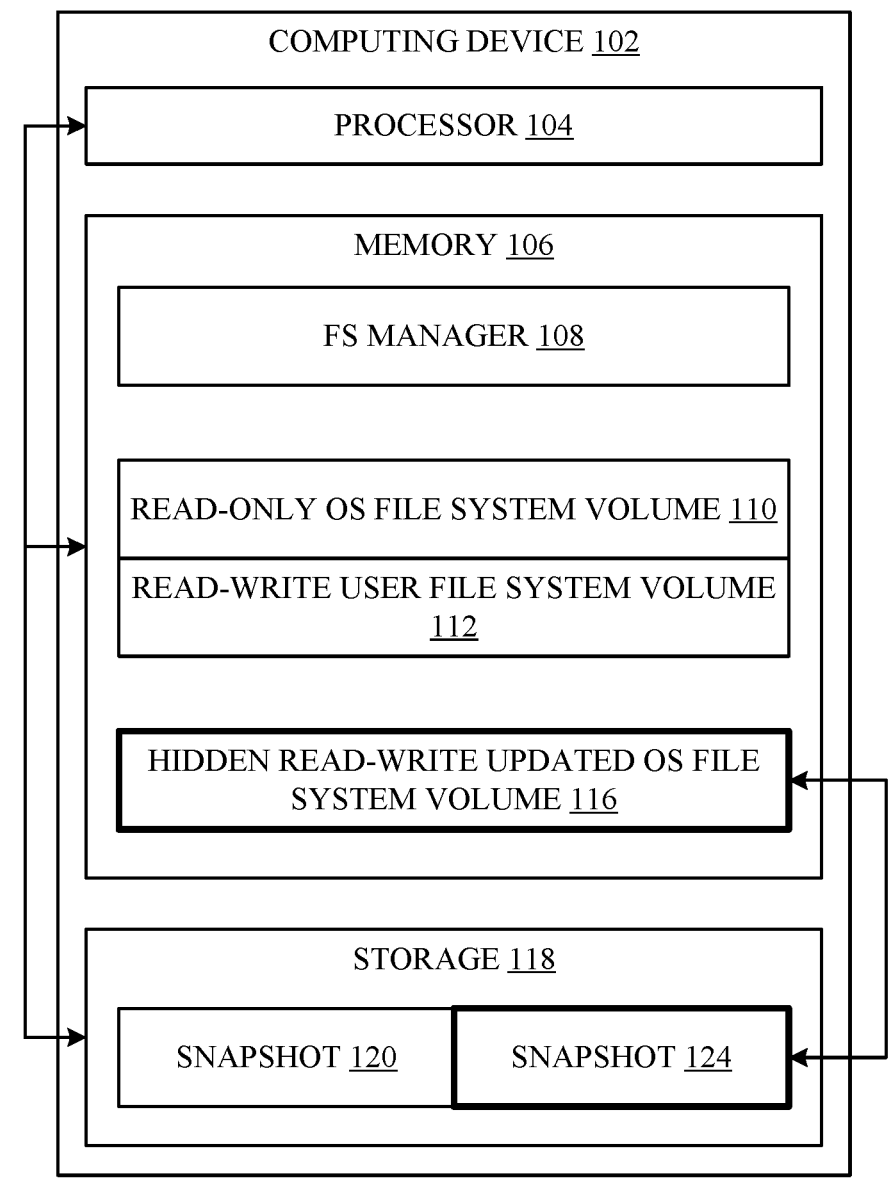

Turning now to FIG. 2D, at step 230, the hidden read/write OS file system volume 114 is converted into a hidden read/write updated OS file system volume 116 that represents the hidden read/write OS file system volume 114 after the OS update package 122 is processed. Additionally, and as also shown in FIG. 2D, at step 230, the file system manager 108 generates a second snapshot 124 based on the hidden read/write updated OS file system volume 116, and stores the second snapshot 124 within the storage 118 (or other available storage). At this point in the live update process, the file system manager 108 can update a configuration such that the hidden read/write updated OS file system volume 116 becomes the primary file system volume 109 on the computing device 102.

Figure 2E:
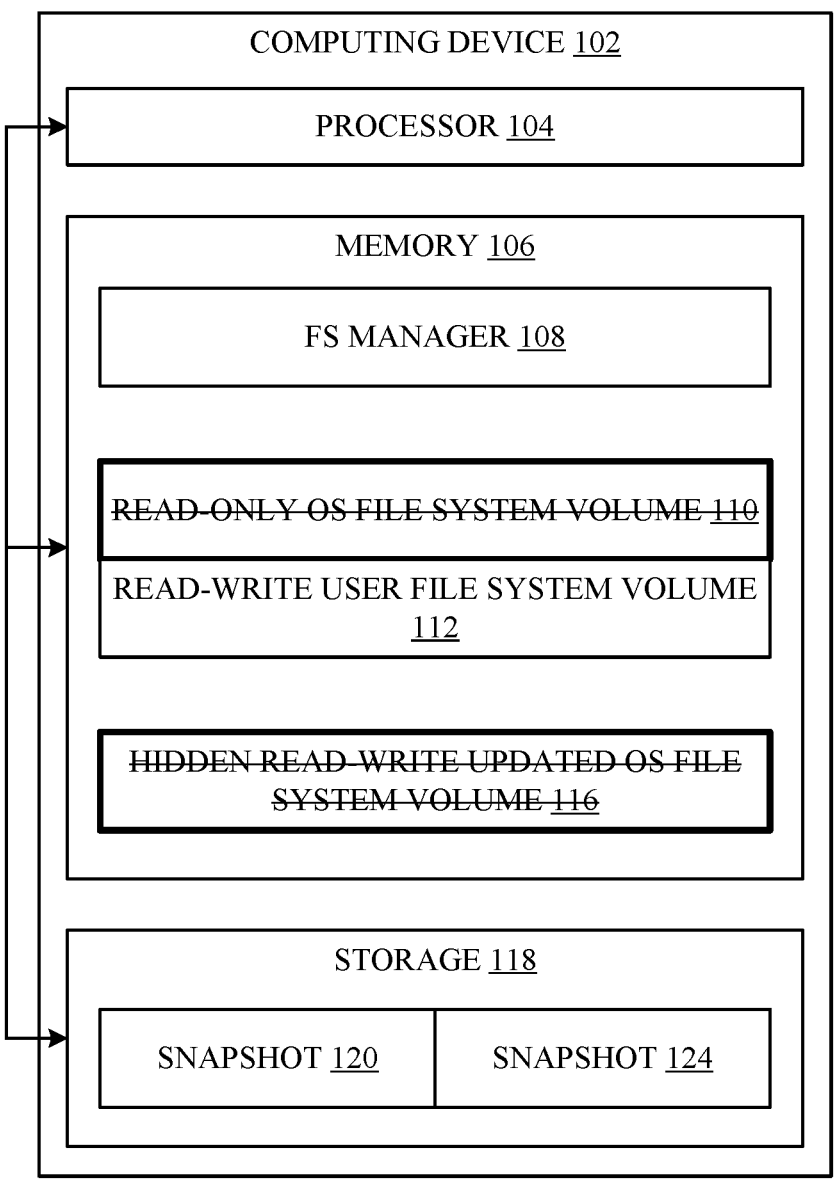

Accordingly, and turning now to FIG. 2E, at step 240, the file system manager 108 eliminates/unmounts the read-only OS file system volume 110, and also eliminates/unmounts the hidden read/write updated OS file system volume 116. According to some embodiments, eliminating/unmounting a file system volume at the computing device 102 can involve updating a configuration of the computing device 102 such that the contents of the file system volume are no longer accessible. According to some embodiments, this can involve rebooting the computing device 102, performing a live configuration update at the computing device 102, and/or the like. For example, the OS update package 122 can indicate whether or not a hard restart of the computing device 102 is necessary for the update to be properly reflected at the computing device 102. In any case, step 240 involves eliminating/unmounting the old/outdated read-only OS file system volume 110, eliminating/unmounting the hidden read/write updated OS file system volume 116, and then re-mounting the updated OS file system volume 116 in a read-only mode (which is described below in greater detail in conjunction with FIG. 2F)

Figure 2F:
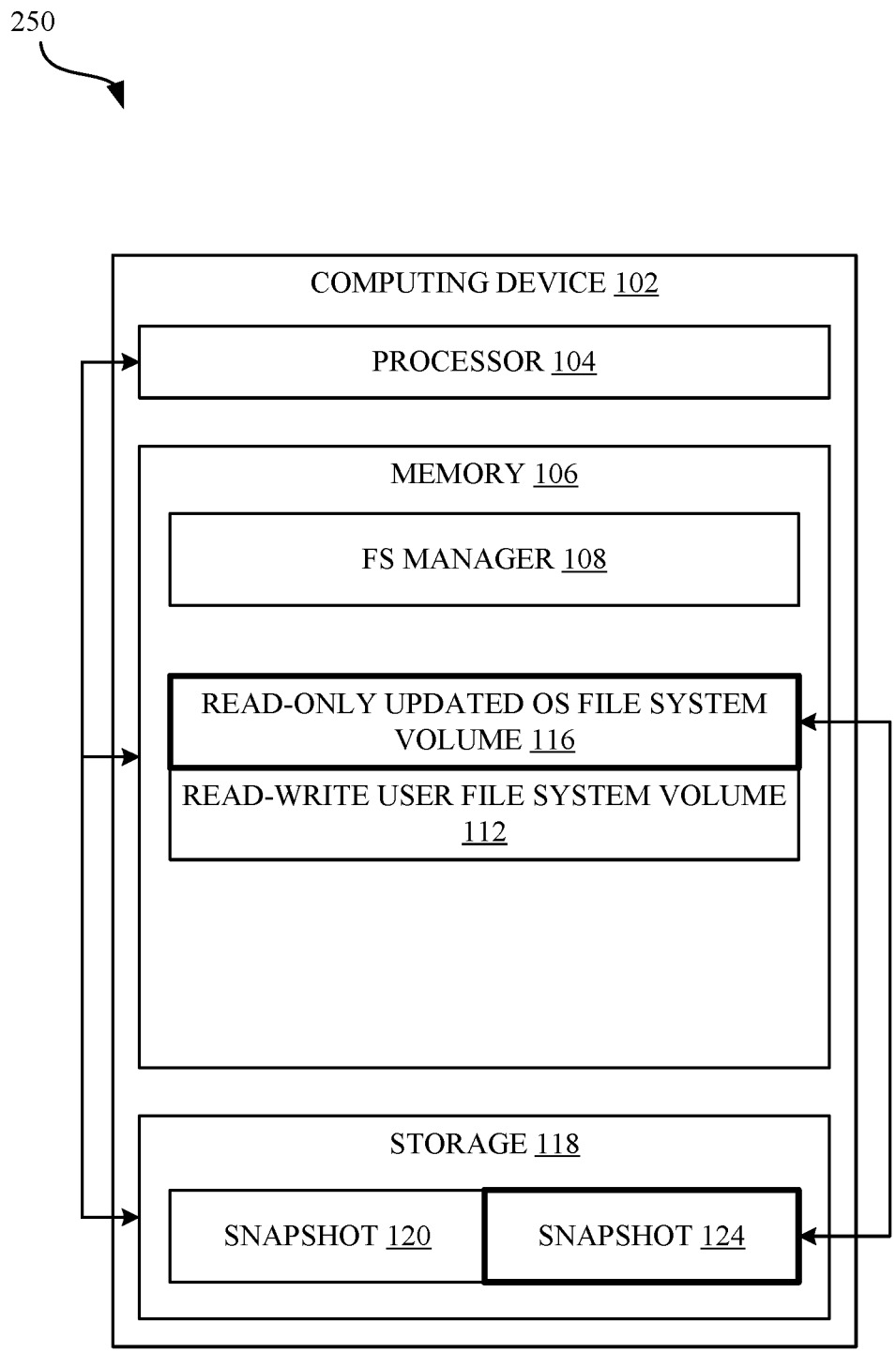

Accordingly, and turning now to FIG. 2F, at step 250, the file system manager 108 establishes a read-only mount of the updated OS file system volume 116, while maintaining/restoring (e.g., when the computing device 102 is rebooted) the read-write user file system volume 112. As shown in FIG. 2F, the read-only mount of the updated OS file system volume 116 can be established based on the second snapshot 124 that is generated in conjunction with step 230 of FIG. 2D, described above in detail.

Figure 2G:
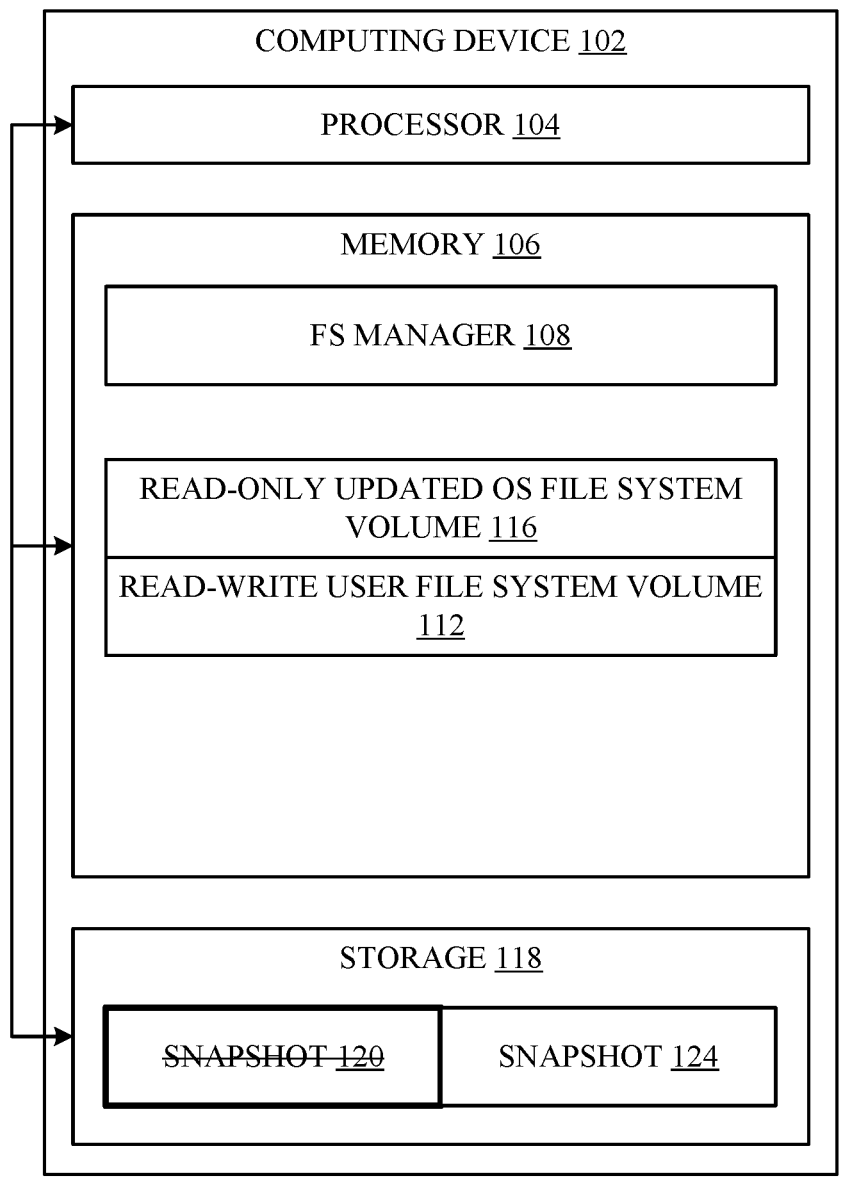

Turning now to FIG. 2G, optional step 260 can be carried out, which involves the file system manager 108 eliminating/deleting the first snapshot 120, as the second snapshot 124 is intact and can enable the computing device 102 to effectively establish the read-only mount of the updated OS file system volume 116 (e.g., each time the computing device 102 is powered-on). According to some embodiments, when a prior snapshot is deleted (e.g., the first snapshot 120), the file system manager 108 can take measures to ensure that the deletion of the prior snapshot does not reduce the availability of any data that is needed by subsequent snapshots. In other words, subsequent snapshots will not be affected in any way by the deletion of a prior snapshot, as the subsequent snapshots will still contain all of the information necessary to enable their respective file system volumes to be mounted. Alternatively, the file system manager 108 can retain the snapshot 120, e.g., as a restoration option in situations where the updated OS file system volume 116 does not function properly, when a user of the computing device 102 desires to roll back to a previous configuration, and the like.

Figure 2H:
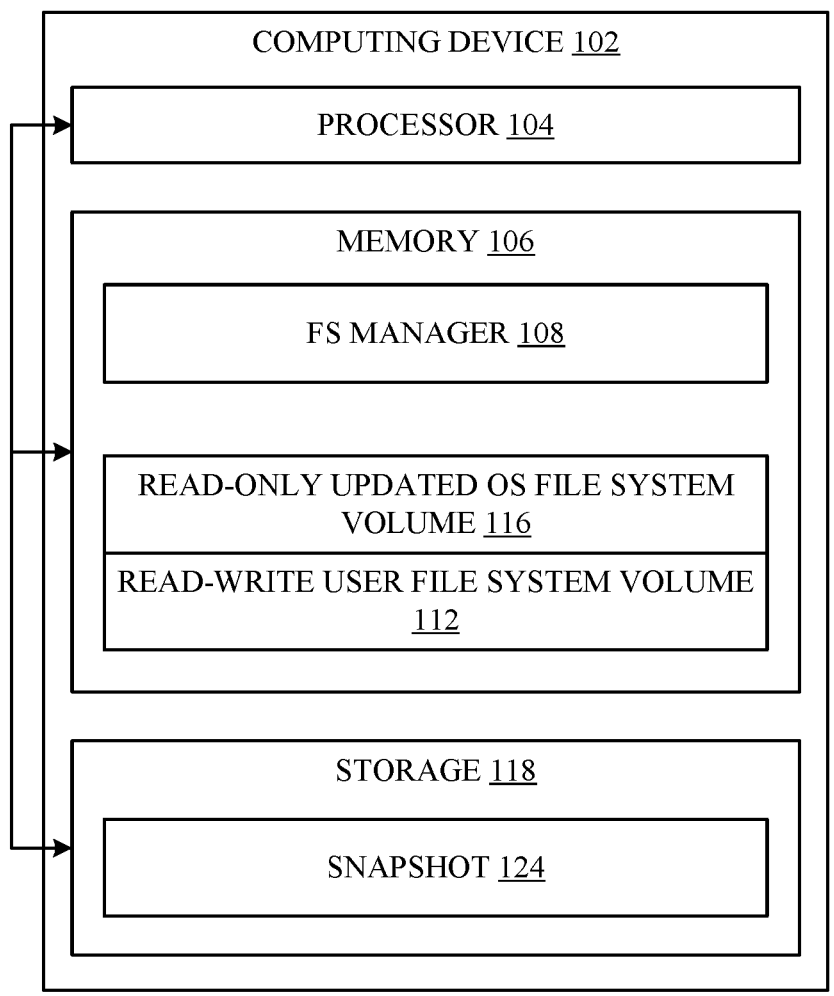

Turning to FIG. 2H, step 270 represents an illustration of a stable state of the computing device 102 after steps 200-260 are carried out by the file system manager 108. As shown in FIG. 2H, the snapshot 124 is intact and can be utilized each time the updated OS file system volume 116 is mounted in a read-only mode. Moreover, when the computing device 102/file system manager 108 receives a subsequent OS update package 122, the file system manager 108 can be configured to mount the OS file system volume 109 in a hidden read/write mode. Subsequently, the file system manager 108 can carry out steps 220-260 described above in detail to process the subsequent OS update package 122. In this manner, the computing device 102/file system manager 108 are capable of performing live updates to file system volumes 109 at the computing device 102 in a highly stable manner while substantially reducing the overall downtime that is required when carrying out conventional file system volume update processes.

Figure 3:
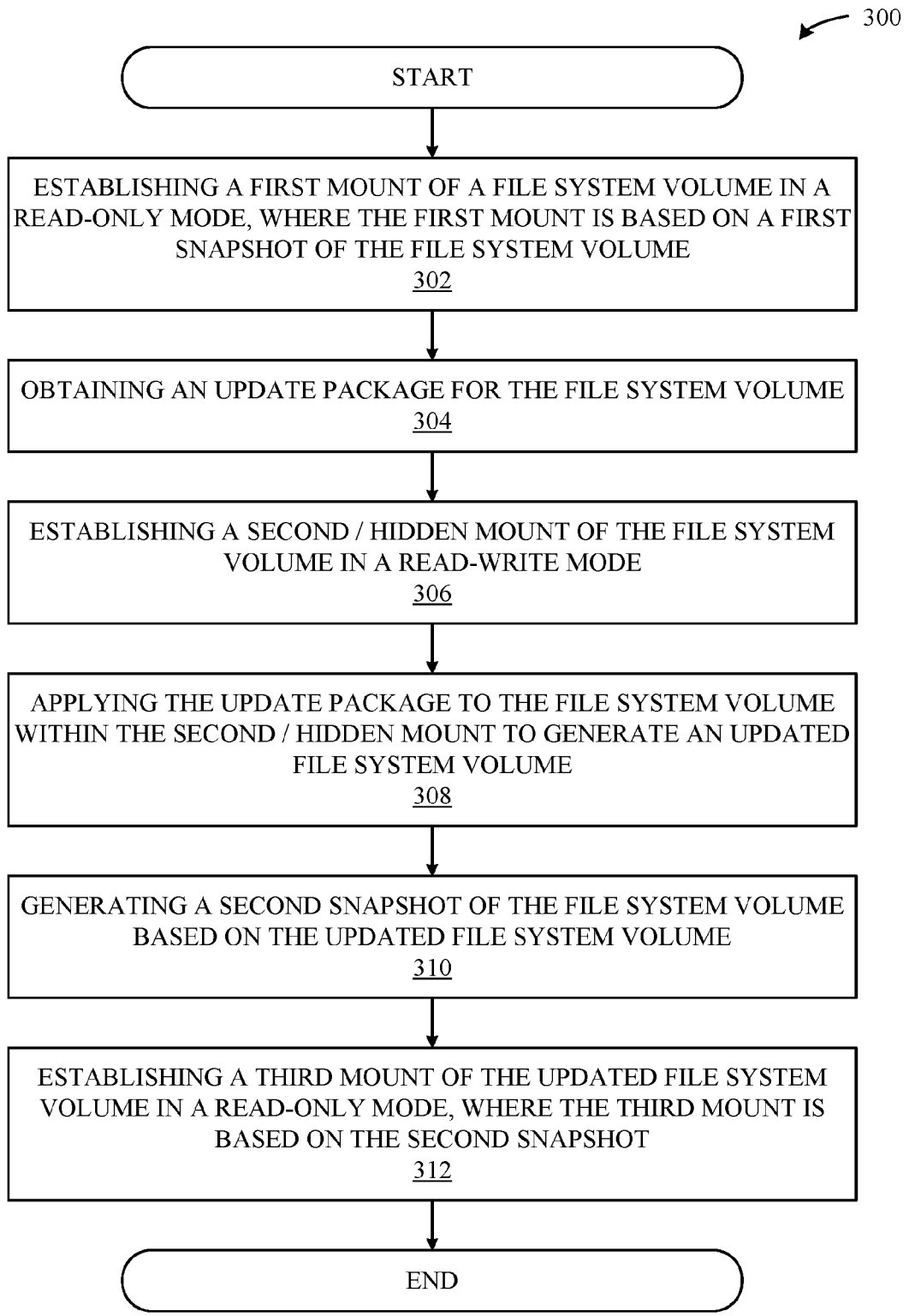
FIG. 3 illustrates a method for carrying out a live update of a file system volume on the computing device of FIG. 1, according to some embodiments.

FIG. 3 illustrates a method 300 for carrying out a live update of a file system volume 109 on the computing device of FIG. 1, according to some embodiments. As shown in FIG. 3, the method 300 begins at step 302, and involves the FS manager 108 establishing a first mount of a file system volume 109 in a read-only mode. The file system manager 108 can establish the first mount of the file system volume 109 in response to the a boot-up of the computing device 102, where the file system volume 109 represents a core OS configured to execute on the computing device 102. As shown in FIG. 3, the first mount can be based on a first snapshot 120 of the file system volume 109. It is noted that the term "first" snapshot 120 is used merely to distinguish the first snapshot 120 from the second snapshot 120 described below at step 310, and that the terms "first" and "second" do not in any way represent temporal/sequential restrictions that must be enforced when implementing the techniques herein. For example, the first snapshot 120/second snapshot 120 can represent different snapshots, in any order, among a plurality of snapshots that are available within the storage 118.

At step 304, the FS manager 108 obtains an update package 122 for the file system volume 109. The update package 122 can be received at the computing device 102 according to any known technique, e.g., an over-the-air (OTA) update, a download, a local file transfer, and the like. According to some embodiments, the update package 122 can be pushed to the computing device 102 (e.g., by way of a push notification), the update package 122 can be pulled to the computing device 102 (e.g., by way of querying/downloading), and so on.

At step 306, the FS manager 108 establishes a second/hidden mount of the file system volume 109 in a read-write mode. According to some embodiments, step 306 can involve establishing the second mount of the file system volume 109 in an area of memory that is accessible to the file system manager 108 but is not accessible to other file system volumes 109 mounted at the computing device 102. In this manner, it can be difficult for malicious parties to access the second/hidden mount of the file system volume 109, which could otherwise be problematic as the second/hidden mount is readable/writable and could potentially be modified in a harmful manner.

At step 308, the FS manager 108 applies the update package 122 to the file system volume 109 within the second/hidden mount to generate an updated file system volume 109. As previously noted herein, the update package 122 can include executables/data for modifying the content associated with the file system volume 109, e.g., a core OS of the computing device 102. At step 308 the file system manager 108 can also be configured to analyze the content of the updated file system volume 109 to ensure that the update package 122 was successfully/properly processed.

At step 310, the FS manager 108 generates a second snapshot 120 of the file system volume 109 based on the updated file system volume 109 generated at step 308. Although not illustrated in FIG. 3, step 310 can also optionally involve eliminating the first snapshot 120, e.g., to increase available storage space, to prevent users from rolling back previous/unsupported/unstable file system volumes 109, and the like. Finally, at step 312, the FS manager 108 establishes a third mount of the updated file system volume 109 in a read-only mode, where the third mount is based on the second snapshot 120. Accordingly, at the completion of step 312, the updated file system volume 109 is mounted at the computing device 102 in a stable manner.

Figure 4:
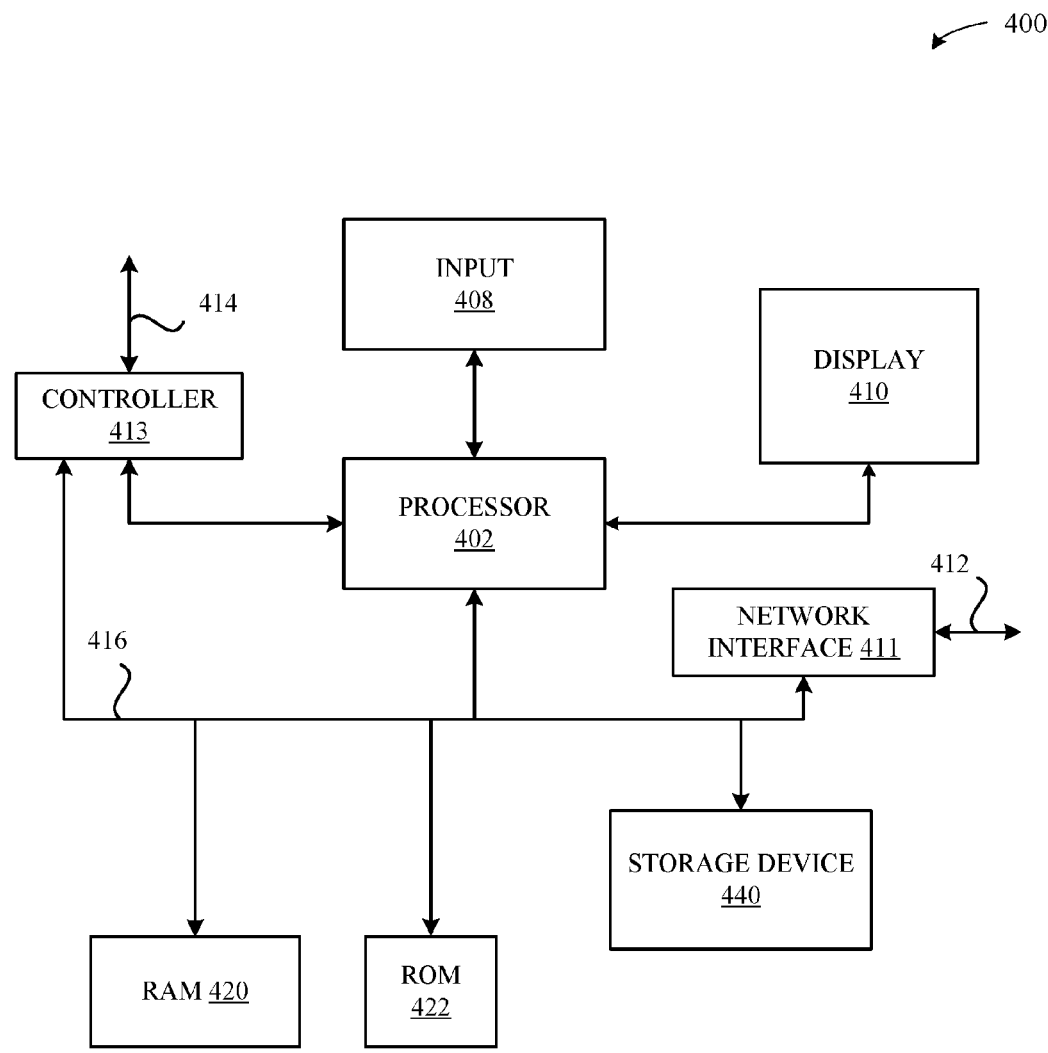
FIG. 4 illustrates a block diagram of a computing device that can represent the components of a computing device or any other suitable device or component for realizing any of the methods, systems, apparatus, and embodiments described herein.

FIG. 4 illustrates a detailed view of a computing device 400 that can be used to implement the various techniques described herein, according to some embodiments. In particular, the detailed view illustrates various components that can be included in the computing device 102 illustrated in FIG. 1. As shown in FIG. 4, the computing device 400 can include a processor 402 that represents a microprocessor or controller 413 for controlling the overall operation of computing device 400. The computing device 400 can also include a user input device 408 that allows a user of the computing device 400 to interact with the computing device 400. Still further, the computing device 400 can include a display 410 (screen display) that can be controlled by the processor 402 to display information to the user. A data bus 416 can facilitate data transfer between the storage device 440, the processor 402, and the controller 413. The controller 413 can be used to interface with and control different equipment through an equipment control bus 414. The computing device 400 can also include a network/bus interface 411 that couples to a data link 412. In the case of a wireless connection, the network/bus interface 411 can include a wireless transceiver.

The computing device 400 also include a storage device 440, which can comprise a single disk or multiple disks (e.g., hard drives), and includes a storage management module that manages one or more partitions within the storage device 440. In some embodiments, the storage device 440 can, alternatively or in addition, include flash memory, persistent memory, semiconductor (solid state) memory or the like. The computing device 400 can also include a Random Access Memory (RAM) 420 and a Read-Only Memory (ROM) 422. The ROM 422 can store programs, utilities or processes to be executed in a non-volatile manner. The RAM 420 can provide volatile data storage, and stores instructions related to the operation of the computing device 400.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for performing a live update of an operating system volume on a computing device, the method comprising, at the computing device:
    establishing a first mount of the operating system volume in a read-only mode, wherein the first mount is based on a first snapshot of the operating system volume, and the operating system volume enables an operating system to be executed on the computing device;
    establishing a second mount of a user volume in a read-write mode, wherein the user volume stores data associated with a user of the computing device;
    obtaining an update package for the operating system volume;
    establishing a third mount of the operating system volume in a read-write mode, wherein the third mount is a hidden mount that is not accessible to the user;
    applying the update package to the operating system volume within the third mount to generate an updated operating system volume;
    generating a second snapshot of the operating system volume based on the updated operating system volume; and
    establishing a fourth mount of the updated operating system volume in a read-only mode, wherein the fourth mount is based on the second snapshot.

2. The method of claim 1, wherein the first mount of the operating system volume is established when the computing device is booting, and the operating system volume comprises components of an operating system (OS) configured to execute on the computing device.

3. The method of claim 1, wherein the user volume operating system volume comprises user applications and user data.

4. The method of claim 1, further comprising, prior to generating the second snapshot of the operating system volume:
    analyzing the updated operating system volume to confirm that the update package is properly applied to the operating system volume.

5. The method of claim 1, further comprising, subsequent to generating the second snapshot:
    deleting the first snapshot.

6. The method of claim 1, wherein the computing device is rebooted in conjunction with establishing the fourth mount of the updated operating system volume.

7. The method of claim 6, wherein, when the computing device is rebooted, the first mount and the third mount are unmounted.

8. The method of claim 1, further comprising, prior to establishing the first mount of the operating system volume in the read-only mode:
    generating the first snapshot of the operating system volume.

9. The method of claim 1, wherein the third mount of the operating system volume is hidden and cannot be viewed through the first mount of the operating system volume.

10. At least one non-transitory computer readable storage medium configured to store instructions that, when executed by at least one processor included in a computing device, cause the computing device to perform a live update of a operating system volume on the computing device, by carrying out steps that include:
    establishing a first mount of the operating system volume in a read-only mode, wherein the first mount is based on a first snapshot of the operating system volume, and the operating system volume enables an operating system to be executed on the computing device;
    establishing a second mount of a user volume in a read-write mode, wherein the user volume stores data associated with a user of the computing device;
    obtaining an update package for the operating system volume;
    establishing a third mount of the operating system volume in a read-write mode, wherein the third mount is a hidden mount that is not accessible to the user;
    applying the update package to the operating system volume within the third mount to generate an updated operating system volume;
    generating a second snapshot of the operating system volume based on the updated operating system volume; and establishing a fourth mount of the updated operating system volume in a read-only mode, wherein the fourth mount is based on the second snapshot.

11. The at least one non-transitory computer readable storage medium of claim 10, wherein the first mount of the operating system volume is established when the computing device is booting, and the operating system volume comprises components of an operating system (OS) configured to execute on the computing device.

12. The at least one non-transitory computer readable storage medium of claim 10, wherein the user volume operating system volume comprises user applications and user data.

13. The at least one non-transitory computer readable storage medium of claim 10, wherein the computing device is rebooted in conjunction with establishing the fourth mount of the updated operating system volume.

14. The at least one non-transitory computer readable storage medium of claim 13, wherein, when the computing device is rebooted, the first mount and the third mount are unmounted.

15. The at least one non-transitory computer readable storage medium of claim 10, wherein the third mount of the operating system volume is hidden and cannot be viewed through the first mount of the operating system volume.

16. A computing device configured to perform a live update of a operating system volume on the computing device, the computing device comprising:
    at least one memory;
    at least one processor communicatively coupled to the at least one memory, the at least one processor to cause the computing device to:
        establish a first mount of the operating system volume in a read-only mode, wherein the first mount is based on a first snapshot of the operating system volume, and the operating system volume enables an operating system to be executed on the computing device;
        establish a second mount of a user volume in a read-write mode, wherein the user volume stores data associated with a user of the computing device;
        obtain an update package for the operating system volume;
        establish a third mount of the operating system volume in a read-write mode, wherein the third mount is a hidden mount that is not accessible to the user;
        apply the update package to the operating system volume within the third mount to generate an updated operating system volume;
        generate a second snapshot of the operating system volume based on the updated operating system volume; and
        establish a fourth mount of the updated operating system volume in a read-only mode, wherein the fourth mount is based on the second snapshot.

17. The computing device of claim 16, wherein the first mount of the operating system volume is established when the computing device is booting, and the operating system volume comprises components of an operating system (OS) configured to execute on the computing device.

18. The computing device of claim 16, wherein the user volume operating system volume comprises user applications and user data.

19. The computing device of claim 16, wherein the at least one processor, prior to establishment of the first mount of the operating system volume in the read-only mode, is to:
    generate the first snapshot of the operating system volume.

20. The computing device of claim 16, wherein the third mount of the operating system volume is hidden and cannot be viewed through the first mount of the operating system volume.

* * * * *